(12) United States Patent  
Adelmann et al.

(10) Patent No.: US 8,863,507 B2  
(45) Date of Patent: Oct. 21, 2014

(54) EXHAUST GAS PURIFICATION SYSTEM FOR THE TREATMENT OF ENGINE EXHAUST GASES BY MEANS OF SCR CATALYST

(75) Inventors: Katja Adelmann, Darmstadt (DE); Nicola Soeger, Nidderau (DE); Marcus Pfeifer, Solingen (DE); Wolfgang Schneider, Rodenbach (DE); Gerald Jeske, Neuberg (DE); Thomas Kreuzer, Wiesbaden (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 952 days.

(21) Appl. No.: 12/937,089

(22) PCT Filed: Mar. 18, 2009

(86) PCT No.: PCT/EP2009/001997

§ 371 (c)(1),
(2), (4) Date: Mar. 7, 2011

(87) PCT Pub. No.: WO2009/124643

PCT Pub. Date: Oct. 15, 2009

(65) Prior Publication Data

US 2011/0146237 A1 Jun. 23, 2011

(30) Foreign Application Priority Data

Apr. 11, 2008 (EP) .................................... 08007163

(51) Int. Cl.
*F01N 3/10* (2006.01)
*B01J 23/00* (2006.01)
(Continued)

(52) U.S. Cl.
CPC .......... *B01D 53/9418* (2013.01); *B01J 2523/00* (2013.01); *B01D 53/9477* (2013.01);
(Continued)

(58) Field of Classification Search
CPC ................ B01D 53/9418; B01D 2255/20761; B01J 23/002; B01J 23/30; B01J 29/7615; B01J 35/0006; F01N 3/106; F01N 3/2066
USPC .......................................................... 60/303
See application file for complete search history.

(56) References Cited

U.S. PATENT DOCUMENTS 4,961,917 A 10/1990 Byrne
5,516,497 A 5/1996 Speronello et al.
(Continued)

FOREIGN PATENT DOCUMENTS

CA 2010970 8/1990
DE 10 2006 031724 4/2008
(Continued)

OTHER PUBLICATIONS

English language translation of International Preliminary Report on Patentability for PCT/EP2009/001997 mailed Nov. 30, 2010.
(Continued)

*Primary Examiner* — Thomas Denion
*Assistant Examiner* — Jason Shanske
(74) *Attorney, Agent, or Firm* — Smith, Gambrell & Russell, LLP

(57) ABSTRACT

An exhaust gas purification system (method and device) for the treatment of diesel exhaust gases containing nitrogen oxides and hydrocarbons is disclosed, which comprises the addition of ammonia or of a compound decomposable to ammonia into the exhaust gas stream and the subsequent leading of the exhaust gas stream over two successively arranged SCR catalysts with different properties and compositions. Both SCR catalysts are free of vanadium compounds and only the downstream SCR catalyst contains zeolite compounds. The exhaust gas purification system according to the invention is characterized by good "kick-off" behavior at low temperatures and a simultaneously high conversion performance over a wide temperature range.

20 Claims, 3 Drawing Sheets

Figure 1:
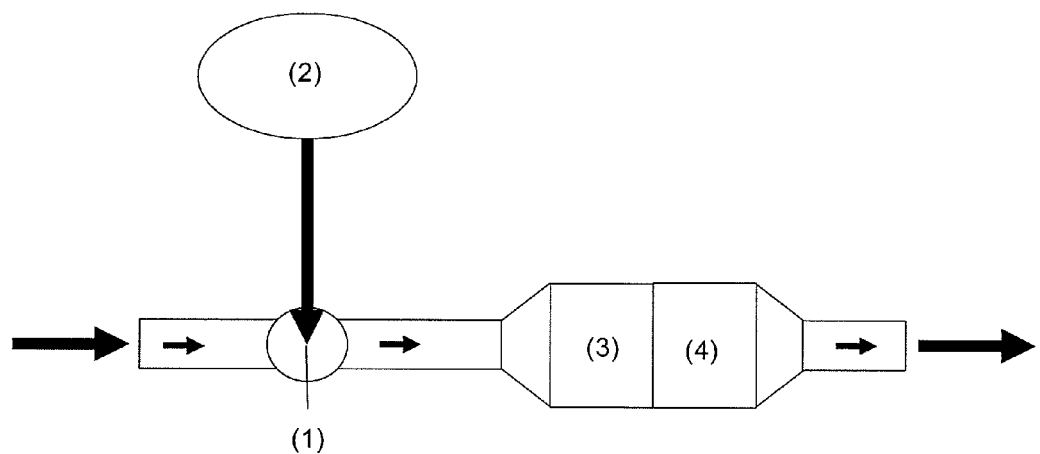

(51) Int. Cl.
    *B01J 29/76*     (2006.01)
    *F01N 3/20*     (2006.01)
    *B01J 35/00*     (2006.01)
    *F01N 13/00*     (2010.01)
    *B01J 23/30*     (2006.01)
    B01D 53/94     (2006.01)
    F01N 3/035     (2006.01)
    B01J 37/02     (2006.01)
    B01J 29/072     (2006.01)

(52) U.S. Cl.
CPC .................. B01D 2255/20776 (2013.01); F01N 2570/18 (2013.01); *B01J 23/002* (2013.01); *F01N 3/106* (2013.01); B01D 2255/20761 (2013.01); F01N 3/035 (2013.01); B01D 2258/012 (2013.01); *B01J 29/7615* (2013.01); *F01N 3/2066* (2013.01); *B01J 35/0006* (2013.01); B01J 37/0246 (2013.01); F01N 2510/0682 (2013.01); B01D 2255/407 (2013.01); F01N 13/0093 (2013.01); Y02T 10/24 (2013.01); B01J 37/0201 (2013.01); B01J 37/0248 (2013.01); *B01J 23/30* (2013.01); B01J 29/072 (2013.01); B01D 2255/50 (2013.01)
USPC .............................. 60/303; 60/274

(56) References Cited

U.S. PATENT DOCUMENTS

| | | | |
|---|---|---|---|
| 6,471,924 B1 * | 10/2002 | Feeley et al. | 423/213.5 |
| 6,914,026 B2 | 7/2005 | Tran et al. | |
| 2003/0050182 A1 | 3/2003 | Tran et al. | |
| 2005/0232838 A1 * | 10/2005 | Cichanowicz | 423/239.1 |
| 2006/0039843 A1 | 2/2006 | Patchett et al. | |
| 2006/0153761 A1 * | 7/2006 | Bandl-Konrad et al. | 423/239.1 |
| 2006/0254258 A1 * | 11/2006 | Blakeman et al. | 60/286 |
| 2007/0025901 A1 * | 2/2007 | Nakatsuji et al. | 423/239.2 |
| 2007/0036694 A1 * | 2/2007 | Nishioka et al. | 422/168 |
| 2007/0074504 A1 * | 4/2007 | Driscoll et al. | 60/285 |
| 2007/0092426 A1 * | 4/2007 | Driscoll et al. | 423/352 |
| 2007/0180816 A1 * | 8/2007 | Masuda et al. | 60/274 |
| 2007/0243120 A1 * | 10/2007 | Sato | 423/239.1 |
| 2008/0038174 A1 * | 2/2008 | Mori et al. | 423/237 |
| 2010/0034717 A1 | 2/2010 | Adelmann et al. | |
| 2010/0115930 A1 * | 5/2010 | Brown et al. | 60/297 |
| 2010/0209327 A1 | 8/2010 | Soeger et al. | |

FOREIGN PATENT DOCUMENTS

| | | |
|---|---|---|
| EP | 0 385 164 | 9/1990 |
| EP | 0 393 905 | 10/1990 |
| EP | 1 495 804 | 1/2005 |
| EP | 1 795 724 | 6/2007 |
| JP | H09-150036 | 6/1997 |
| JP | 2006-057578 | 3/2006 |
| JP | 2007-239752 | 9/2007 |
| WO | 00/29728 | 5/2000 |
| WO | 2008/006427 | 1/2008 |
| WO | 2008/049491 | 5/2008 |

OTHER PUBLICATIONS

English language translation of the Written Opinion of the International Search Authority for PCT/EP2009/001997 mailed Nov. 25, 2010.

International Search Report for PCT/EP2009/001997 mailed Jul. 20, 2009.

* cited by examiner

EXHAUST GAS PURIFICATION SYSTEM FOR THE TREATMENT OF ENGINE EXHAUST GASES BY MEANS OF SCR CATALYST

The invention relates to an exhaust gas purification system (method and device) for the treatment of the exhaust gases of internal combustion engines using SCR catalysts and ammonia fed into the exhaust system or a compound decomposable to ammonia as reducing agent.

The exhaust gas of diesel engines and of gasoline engines operated with a lean air/fuel mixture contains, along with the usual polluting gases carbon monoxide CO, hydrocarbons HC and nitrogen oxides $NO_x$, a relatively high oxygen content of up to 15 vol. %. Carbon monoxide and hydrocarbons can easily be made harmless by oxidation. The reduction of the nitrogen oxides to nitrogen is much more difficult, because of the high oxygen content.

A known method for removing nitrogen oxides from exhaust gases in the presence of oxygen is the method of selective catalytic reduction (SCR) by means of ammonia, which can also be produced in situ from a precursor compound, for example urea. In this method the comproportionation of nitrogen oxides with ammonia, with formation of nitrogen, takes place on a suitable catalyst, called an SCR catalyst for short.

EP-B 0 385 164 describes so-called total catalysts for the selective reduction of nitrogen oxides with ammonia, which in addition to titanium dioxide and at least one oxide of tungsten, silicon, boron, aluminum, phosphorus, zirconium, barium, yttrium, lanthanum and cerium, contain an additional component, selected from the group consisting of the oxides of vanadium, niobium, molybdenum, iron and copper.

U.S. Pat. No. 4,961,917 claims catalyst formulations for the reduction of nitrogen oxides with ammonia, which in addition to zeolites with a silica:alumina ratio of at least 10 and a porous structure, which is connected in all directions in space by pores with an average kinetic pore diameter of at least 7 Å, contain iron and/or copper as promoters. EP-A 1 495 804 and U.S. Pat. No. 6,914,026 describe methods for improving the stability of such zeolite-based systems under conditions of hydrothermal aging.

The SCR catalyst formulations described in the stated specifications, which represent the state of the art, have in common that they only display good nitrogen oxide conversion rates in a particular temperature range—often only above 350° C. As a rule, conversion is only optimal in a relatively narrow temperature range. This optimal conversion is typical of SCR catalysts and is due to the way the catalysts work.

When used in motor vehicles, because of the transient manner of operation of internal combustion engines the SCR catalyst is often subject to wildly fluctuating operating conditions. To meet the legally prescribed emission limits, however, highest possible nitrogen oxide conversions, with good selectivity, must also be ensured at operating points that lie outside of the optimal conversion of the SCR catalyst. Complete and selective nitrogen oxide conversion at low temperatures must also be ensured, just as the selective and complete conversion of large amounts of nitrogen oxides in very hot exhaust gas, such as are formed for example when running at full load.

Therefore SCR catalysts such as the formulations stated in EP-B 0 385 164 or U.S. Pat. No. 4,961,917 are occasionally used in combination with another nitrogen oxide reduction catalyst with a different working range, so as to be able to ensure the removal of nitrogen oxides at all working temperatures arising in driving conditions, which are between 200° C. and 600° C.

Thus, US 2006/0039843 A1 describes an exhaust gas purification system containing a metering device for ammonia or an ammonia precursor compound and a first catalyst substrate, on which an SCR-catalytically active coating is arranged upstream and an ammonia blocking catalyst coating downstream. In a preferred embodiment, a second SCR catalyst is arranged between the metering device for ammonia or an ammonia precursor compound and the first catalyst substrate. Vanadium-containing SCR catalysts and/or zeolite-based SCR catalysts are preferably used as SCR catalysts in this arrangement, in order to achieve sufficiently good conversions.

EP-A 1 795 724 also describes an exhaust gas purification system containing a metering device for urea solution as compound decomposable to ammonia, and two SCR catalysts arranged in succession. The catalyst arranged upstream is active at high temperature and preferably contains vanadium oxide, and the catalyst arranged downstream is active at low temperature and preferably contains Cu-, Fe-, Co- or Ag-zeolite or Cu-, Fe-, Co- or Ag-alumina.

The use of vanadium-containing catalysts is toxicologically questionable, owing to the high volatility of vanadium compounds in oxygen-containing, moist atmosphere at elevated temperatures.

EP-A 0 393 905 and/or U.S. Pat. No. 5,516,497 disclose methods for conversion of nitrogen oxides with ammonia in a gas stream, comprising (i) passing the gas stream containing $NO_x$ and ammonia through a first catalyst zone containing an iron- and/or copper-promoted first zeolite and (ii) passing the resultant gas stream with lowered content of nitrogen oxides, which contains unreacted ammonia, through a second catalyst zone, which also contains an iron- and/or copper-promoted, second zeolite. The two catalyst zones differ in content of the promoters and, according to the information given in this specification, consequently in their functions: the first zone, which contains up to 1 wt. % iron and/or copper, effectively catalyzes the reduction of nitrogen oxides with ammonia, whereas the second zone, which contains more than 1 wt. % iron and/or copper, is effective in the oxidation of ammonia to nitrogen.

The use of exclusively zeolite-based SCR catalyst systems is very expensive, because of the high raw material prices for zeolites.

WO 2008/006427 discloses an SCR catalyst, which is made up of two material zones arranged in succession on a support. The material zones are characterized by different conversion profiles in the SCR reaction, wherein the conversion profile of the material zone first contacted with the exhaust gas to be purified is at higher temperatures than the conversion profile of the material zone subsequently contacted with the exhaust gas to be purified. The catalyst is characterized in that the zone contacted with the exhaust gas first contains iron-exchanged zeolites and the material zone subsequently contacted with the exhaust gas to be purified contains a transition metal-exchanged zeolite or a transition metal oxide selected from the group consisting of vanadium pentoxide, tungsten trioxide and titanium dioxide or combinations thereof or a transition metal-exchanged zeolite and a transition metal oxide selected from the group consisting of vanadium pentoxide, tungsten trioxide and titanium dioxide or combinations thereof.

Catalysts of this kind show poor "kick-off" behavior, especially with exhaust gas temperatures below 300° C. Furthermore, the $NO_x$ conversion is poorer on SCR catalysts that are mainly constituted of zeolite compounds, when the exhaust gas to be purified contains residues of unburnt hydrocarbons.

The problem to be solved by the present invention is to make available an exhaust gas purification system (method and device) based on SCR technology for lowering the content of nitrogen oxides in diesel engine exhaust gases that contain unburnt hydrocarbons, which is characterized by good "kick-off" behavior at low temperatures and simultaneously high conversion performance over a temperature range as wide as possible. The exhaust gas purification system should be free of toxicologically questionable components such as vanadium and should moreover represent a cost-effective solution.

This problem is solved with a method of treatment of diesel engine exhaust gases containing nitrogen oxides and hydrocarbons, comprising (a) the addition of ammonia or a compound decomposable to ammonia from a source that does not form part of the exhaust system into the exhaust gas stream containing nitrogen oxides and hydrocarbons; (b) passing the exhaust gas stream containing nitrogen oxides, hydrocarbons and ammonia or a compound decomposable to ammonia over a first, upstream SCR catalyst, which effectively catalyzes the comproportionation of nitrogen oxides with ammonia in a temperature range between 300° C. and 500° C., and at least partially oxidizing the hydrocarbons contained in the exhaust gas; and (c) passing the exhaust gas resulting from (b) over a second, downstream SCR catalyst, which effectively catalyzes the comproportionation of nitrogen oxides with ammonia in a temperature range between 150° C. and 400° C. and at the same time stores excess ammonia. For carrying out the method according to the invention, an exhaust gas purification device for lowering the content of nitrogen oxides in the lean exhaust gas of internal combustion engines is proposed, containing in combination and in this order (1) a device for feeding ammonia or a compound decomposable to ammonia into the exhaust gas stream containing nitrogen oxides from a source that does not form part of the exhaust system, and the source for ammonia or a compound decomposable to ammonia; (2) a first SCR catalyst, which effectively catalyzes the comproportionation of nitrogen oxides with ammonia in a temperature range between 300° C. and 500° C. and contains neither vanadium compounds nor zeolite compounds; and (3) a second, vanadium-free SCR catalyst, which effectively catalyzes the comproportionation of nitrogen oxides with ammonia in a temperature range between 150° C. and 400° C. and contains a copper- (Cu-)exchanged zeolite compound.

The exhaust gas purification system (method and device) according to the invention makes the effective lowering of the content of nitrogen oxides possible even in hydrocarbon-containing exhaust gases over a wide temperature range from 150 to 500° C. (the so-called "working window"). It is characterized, in comparison with wholly zeolite-based SCR systems, as described for example in WO 2008/006427 or EP 0 393 905, on the one hand by a considerable cost advantage, and on the other hand by improved "kick-off" behavior in the low temperature range below 300° C. Moreover, the system does not use vanadium compounds, use of which is toxicologically questionable.

The improvement in "kick-off" behavior is due, according to the inventors' findings, to the fact that a composition is selected as first SCR catalyst that is able to oxidize, at least partially, the hydrocarbons contained in the exhaust gas, without storing up significant amounts thereof. It was observed that effective comproportionation of nitrogen oxides with ammonia on vanadium-free catalysts according to the prior art does not take place if the exhaust gas contains hydrocarbons. This inhibition of "kick-off" behavior in hydrocarbon-containing exhaust gases is especially pronounced with the zeolite-containing SCR catalysts. These store hydrocarbons in the porous structure of the zeolite compounds. We believe that these stored hydrocarbons at least partially block the reaction centers in the catalyst that are active in the ammonia-SCR reaction, thus interfering with the comproportionation of the nitrogen oxides with ammonia.

Furthermore, it is found, quite surprisingly, that the device according to the invention makes it possible to adapt the metering strategy for ammonia or for a compound decomposable to ammonia to the dynamic variation of the operating points in the motor vehicle. We believe that for the first time, by the combination according to the invention of a first, downstream zeolite-free and vanadium-free SCR catalyst, which is effective in the temperature range between 300° C. and 500° C., followed by a second, downstream SCR catalyst, which displays maximum activity in the low temperature range between 150° C. and 400° C. and furthermore is able to store up excess ammonia, the metering of the reducing agent is better matched to the amount needed: as a result of the improved "kick-off" behavior, the first SCR catalyst mounted in front reacts extremely flexibly to a varying supply of nitrogen oxides and reducing agent and reacts the incoming nitrogen oxides with the available ammonia without any delay. The subsequent low temperature catalyst, which is able to store up certain amounts of ammonia, buffers short-term oversupply and undersupply of ammonia, which can occur when adjusting the metered amount of reducing agent to changes in operating points. This takes place on the one hand by storage of excessively metered ammonia in the zeolite, and on the other hand by supply of any shortfall of ammonia from the zeolite store. As the SCR catalyst mounted in front according to the invention oxidizes the hydrocarbons present in the exhaust gas, a temporary blockade or a delayed "kick-off" of the subsequent zeolite-containing SCR catalyst in the ammonia-SCR reaction is prevented on account of hydrocarbon stores.

This surprising effect is achieved by mounting two successive SCR catalysts in the exhaust gas purification device as claimed. Each of the two SCR catalysts can be in the form of a coating on an inert support. An embodiment that is advantageous with respect to the restrictions of the available space in the motor vehicle is obtained if the first and the second SCR catalysts are arranged as coatings on the same support. Then the first, upstream SCR catalyst is preferably in the form of a coating zone on the support, arranged on the inlet side, whereas the second, downstream SCR catalyst forms a coating zone on the support on the outlet side. This preferred embodiment of the exhaust gas purification system according to the invention is shown schematically in FIG. 1.

The ratio of the lengths of the two coating zones to one another is also determined by the distance of the resultant zonal catalyst from the engine and therefore by the average prevailing exhaust gas temperature in the component in normal operation. A minimum critical length of the downstream zeolite-containing coating zone must be maintained, to avoid excessively restricting the buffering effect, described above, against ammonia breakthroughs on the one hand and nitrogen oxide breakthroughs on the other hand. The hydrocarbon content in the exhaust gas before the component according to the invention plays an important role in the dimensioning of the length of the front zone. The ratio of the length of the coating zone arranged on the inlet side to the length of the coating zone on the outlet side is preferably between 0.1 and 3, especially preferably between 0.5 and 2. If the average prevailing exhaust gas temperatures are around 300° C. and the exhaust gas does not contain extraordinarily large amounts of hydrocarbons, then the quite especially preferred ratio of the lengths of coating zone arranged on the inlet side to coating zone on the outlet side is between 0.8 and 1.5.

As the first, upstream SCR catalyst, it is necessary to select a composition that effectively catalyzes the comproportionation of nitrogen oxides with ammonia in a temperature range between 300° C. and 500° C., that has the property of oxidizing hydrocarbons at least partially and that moreover contains neither vanadium compounds nor zeolite compounds. Preferred embodiments of this first SCR catalyst contain tungsten oxide $WO_3$ and a homogeneous cerium-zirconium mixed oxide $(Ce,Zr)O_2$, where the content of tungsten oxide $WO_3$ can be between 5 and 25 wt. %, and the content of the homogeneous cerium-zirconium mixed oxide can be between 50 and 95 wt. %, in each case relative to the total amount of the first SCR catalyst without consideration of the mass of the inert support. The content of tungsten oxide $WO_3$ in the first SCR catalyst is preferably between 7 and 17 wt. %, especially preferably between 10 and 15 wt. %, relative to the total amount of the first SCR catalyst without consideration of the mass of the inert support. The content of homogeneous cerium-zirconium mixed oxide $(Ce,Zr)O_2$ in the first SCR catalyst is preferably between 60 and 90 wt. %, especially preferably between 70 and 90 wt. %, relative to the total amount of the first SCR catalyst without consideration of the mass of the inert support. Homogeneous cerium-zirconium mixed oxides $(Ce,Zr)O_2$ in which the weight ratio of cerium oxide $CeO_2$ to zirconium oxide $ZrO_2$ is between 0.43 and 2.33 are suitable. Those having a ratio of $CeO_2$ to $ZrO_2$ between 0.67 and 1.5 are preferably used. Solid solutions of cerium oxide and zirconium oxide with a $CeO_2$ to $ZrO_2$ ratio from 0.8 to 1.2 are especially preferred.

As the second, downstream SCR catalyst a composition is selected that effectively catalyzes the comproportionation of nitrogen oxides with ammonia in a temperature range between 150° C. and 400° C. and contains a copper- (Cu-) exchanged zeolite compound. In addition to copper, consideration may also be given to silver (Ag), gold (Au) or platinum (Pt) as exchange metal, but copper is preferred. The content of the exchange metal can be from 2 to 10 wt. % relative to the total weight of zeolite compound used. Preferably the zeolite compound used contains 3 to 8 wt. % Cu, especially preferably 4 to 6 wt. % Cu, and a suitable zeolite compound is selected advantageously from the group comprising beta- (β-)zeolite, Y-zeolite, ZSM-5, ZSM-20, ferrierite and mordenite.

The exhaust gas purification device described is suitable for carrying out the method of treatment of diesel engine exhaust gases containing nitrogen oxides and hydrocarbons as claimed. The method according to the invention comprises three essential steps, namely
  (a) addition of ammonia or a compound decomposable to ammonia from a source that does not form part of the exhaust system, into the exhaust gas stream containing nitrogen oxides and hydrocarbons;
  (b) passing the exhaust gas stream containing nitrogen oxides, hydrocarbons and ammonia or a compound decomposable to ammonia over a first, upstream SCR catalyst, which effectively catalyzes the comproportionation of nitrogen oxides with ammonia in a temperature range between 300° C. and 500° C. while at least partially oxidizing the hydrocarbons contained in the exhaust gas; and
  (c) passing the exhaust gas resulting from (b) over a second, downstream SCR catalyst, which effectively catalyzes the comproportionation of nitrogen oxides with ammonia in a temperature range between 150° C. and 400° C. and at the same time stores excess ammonia.

The source for ammonia or a compound decomposable to ammonia that does not form part of the exhaust system can for example be an ammonia-filled pressure vessel accommodated in the vehicle. Equally well, it can be a tank for aqueous urea solution or ammonium carbamate solution or other comparable devices known in the prior art.

In carrying out the method according to the invention, good nitrogen oxide conversions are achieved in particular at colder operating points when the exhaust gas stream containing nitrogen oxides and hydrocarbons before addition of ammonia or a compound decomposable to ammonia in (a) is led over an oxidation catalyst, which oxidizes at least a portion of the NO contained in the nitrogen oxides to $NO_2$. If the $NO_2/NO_x$ ratio in the exhaust gas is altered so that the exhaust gas stream, before being led over the first, upstream SCR catalyst in (b), has an $NO_2/NO_x$ ratio from 0.3 to 0.7, the nitrogen oxide conversions are especially high. Quite particularly high nitrogen oxide conversions are obtained when the $NO_2/NO_x$ ratio before being led over the first, upstream SCR catalyst in (b) is set to 0.4 to 0.6 or 0.5.

Also with inclusion of an oxidation catalyst, the exhaust gas purification system according to the invention displays the surprising advantages that have already been described and are due to the specific combination of the features of the method and/or device. This applies in particular at cold-start operating points, in idling and in overrun phases of a diesel vehicle, when the amount of unburnt hydrocarbons from the engine entering the exhaust gas system is so high that it cannot be converted completely on the oxidation catalyst mounted in front.

Furthermore it is advantageous if the amount of ammonia or of a compound decomposable to ammonia to be added to the exhaust gas stream in process step (a) is selected so that the exhaust gas stream, before being led over the first, upstream SCR catalyst in (b), has an $NH_3/NO_x$ ratio from 0.8 to 1.2.

Optionally the exhaust gas stream, after being passed through the second, downstream SCR catalyst in process step (c), can be led over an oxidation catalyst, which selectively catalyzes the oxidation of ammonia to nitrogen. Such an oxidation catalyst, sometimes also called an ammonia blocking catalyst, is arranged in preferred embodiments on a soot particle-filtering support.

The invention is explained in more detail below with some examples, comparative examples and drawings.

FIG. 1: is a schematic representation of a preferred embodiment of the exhaust gas purification device according to the invention with (1) the device for adding ammonia or a compound decomposable to ammonia into the exhaust gas stream (direction of flow marked with "→") from a source (2) that does not form part of the exhaust system, a first SCR catalyst (3), which effectively catalyzes the comproportionation of nitrogen oxides with ammonia in a temperature range between 300° C. and 500° C. and a second SCR catalyst (4), which effectively catalyzes the comproportionation of nitrogen oxides with ammonia in a temperature range between 150° C. and 400° C.

Figure 2:
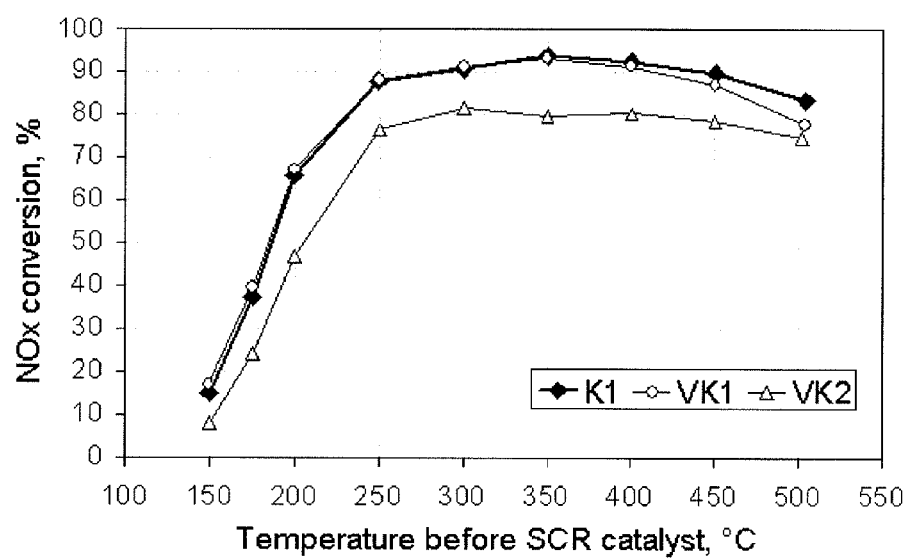

FIG. 2: shows nitrogen oxide conversion in hydrocarbon-containing exhaust gas on freshly prepared catalytically active components containing a catalyst zone on the inlet side with a first SCR catalyst and a catalyst zone on the outlet side with a second SCR catalyst; ratio of the zone lengths=1;
  VK1=$V_2O_2/TiO_2/WO_3$ before Cu-zeolite;
  VK2=Fe-zeolite before Cu-zeolite;

K1=catalytically active component according to the invention: $WO_3/(Ce,Zr)O_2$ before Cu-zeolite FIG. 3: shows the influence of the ratio of the lengths of the catalyst zones on the nitrogen oxide conversion of the catalytically active components according to the invention containing a catalyst zone on the inlet side 1 with a first SCR catalyst and a catalyst zone on the outlet side 2 with a second SCR catalyst;

K1: ratio zone 1:zone 2=1; freshly prepared;
K2: ratio zone 1:zone 2=0.5; freshly prepared;
K1': ratio zone 1:zone 2=1; thermally pretreated;
K2': ratio zone 1:zone 2=0.5; thermally pretreated FIG. 4: shows the temperature variation before and after the catalyst with intentional burnoff of hydrocarbons on an SCR catalyst containing a Cu-exchanged zeolite FIG. 5: is a schematic representation of an embodiment of the exhaust gas purification device according to the invention with an oxidation catalyst (5) that oxidizes at least a portion of the NO contained in the nitrogen oxides to $NO_2$ before addition of ammonia or a compound decomposable to ammonia into the exhaust gas stream.

Figure 6:
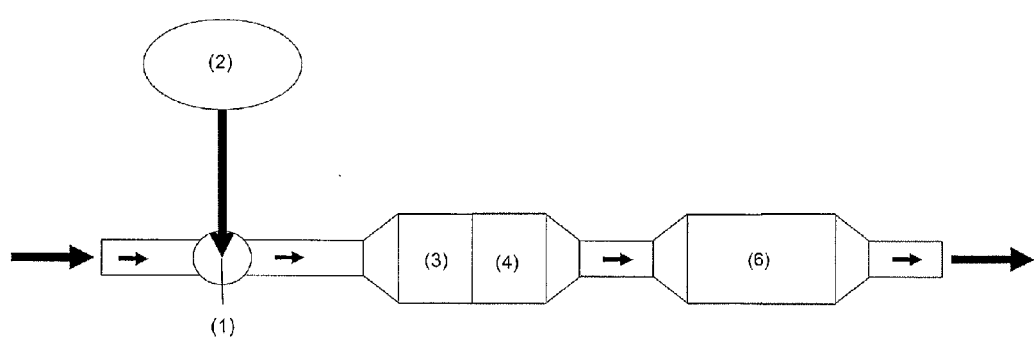

FIG. 6: is a schematic representation of an embodiment of the exhaust gas purification device according to the invention with an oxidation catalyst (6) that selectively catalyzes the oxidation of ammonia to nitrogen downstream of the SCR catalyst.

Figure 7:
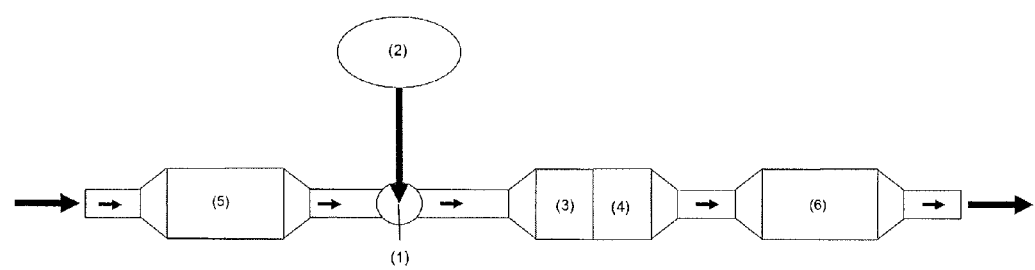

FIG. 7: is a schematic representation of an embodiment of the exhaust gas purification device according to the invention with an oxidation catalyst (5), that oxidizes at least a portion of the NO contained in the nitrogen oxides to $NO_2$ before addition of ammonia or a compound decomposable to ammonia into the exhaust gas stream; and an oxidation catalyst (6), that selectively catalyzes the oxidation of ammonia to nitrogen downstream of the SCR catalyst.

PRODUCTION OF THE CATALYSTS INVESTIGATED

One of the essential features of the exhaust gas system according to the invention is the mounting of two successive SCR catalysts in the direction of flow of the exhaust gas, which catalyze the SCR reaction particularly effectively in different temperature ranges. In preferred embodiments of the exhaust gas system according to the invention, the two successively connected SCR catalysts are arranged as coatings on the same support, resulting in a single catalytically active component with two catalyst zones.

Said catalytically active components with two catalyst zones are produced in the following examples and comparative examples. In all the comparative examples and examples shown, production of the components takes place in the following way:

On an inert ceramic honeycomb with a volume of 0.04 l, a length of 76.2 mm and a cell count of 62 cells per $cm^2$ (wall thickness of the cells: 0.17 mm), the coating containing the first SCR catalyst is applied up to a previously defined point along the length of the inert support in a conventional dipping process. Then the still uncoated portion of the honeycomb is provided with a coating containing the second SCR catalyst, so that the two catalyst zones touch without any overlap.

The components contained in the coatings of the two catalyst zones and the length ratio of the catalyst zones to one another are given below.

Comparative Example 1

A component VK1 was made with the following catalyst zones:

| | |
|---|---|
| Coating containing the first SCR catalyst: zone 1 | commercial SCR catalysts based on $V_2O_5/TiO_2/WO_3$ containing 1.75 wt. % $V_2O_5$: Amount of coating: 280 g/L (relative to the volume of the support proportional to the 1st zone) |
| Coating containing the second SCR catalyst: zone 2 | copper-exchanged β-zeolite compound containing 5 wt. % Cu relative to the total weight of the exchanged zeolite compound: Amount of coating: 175 g/L (relative to the volume of the support proportional to the 2nd zone) |
| length of zone 1:length of zone 2 (zone 1 = upstream; zone 2 = downstream) | 1 |

Comparative Example 2

A component VK2 was made with the following catalyst zones:

| | |
|---|---|
| Coating containing the first SCR catalyst: zone 1 | iron-exchanged ZSM5-zeolite containing 3 wt. % Fe relative to the total weight of the exchanged zeolite compound: Amount of coating: 160 g/L (relative to the volume of the support proportional to the 1st zone) |
| Coating containing the second SCR catalyst: zone 2 | copper-exchanged β-zeolite compound containing 5 wt. % Cu relative to the total weight of the exchanged zeolite compound: Amount of coating: 175 g/L (relative to the volume of the support proportional to the 2nd zone) |
| length of zone 1:length of zone 2 (zone 1 = upstream; zone 2 = downstrean) | 1 |

Example 1

Four components were made with the following composition:

| | |
|---|---|
| Coating containing the first SCR catalyst: zone 1 | $WO_3/(Ce,Zr)O_2$ Amount of coating: 200 g/L (relative to the volume of the support proportional to the 1st zone) |
| Coating containing the second SCR catalyst: zone 2 | copper-exchanged β-zeolite compound containing 5 wt. % Cu relative to the total weight of the exchanged zeolite compound: Amount of coating: 175 g/L (relative to the volume of the support proportional to the 2nd zone) |

For production of the $WO_3/(Ce,Zr)O_2$ mixed oxide for zone 1, a homogeneous cerium-zirconium mixed oxide (manufacturer: MEL; BET surface area: 82 $m^2/g$) with a cerium oxide content of 48 wt. %, relative to its total amount, was activated for the SCR reaction by introducing tungsten. For this, first the amount of water that can be taken up by the cerium-zirconium mixed oxide without the material losing its free-flowing properties was determined. In the corresponding amount of water, the proportion of ammonium metatungstate was dissolved, which corresponded to 10 wt. % tungsten oxide relative to the total weight of the activated cerium-zirconium oxide to be produced. The homogeneous cerium-zirconium oxide was impregnated with the resultant tungsten-containing solution, filling the pores, and was then stored in the stove in air for thermal fixing of the tungsten, at 500° C. for 2 hours. The resultant material was suspended in water, ground and applied as a zone with the corresponding length on the ceramic honeycomb.

The parts differed from one another in the ratio of the lengths of the zones:

| Designation of the parts | length of zone 1:length of zone 2 (zone 1 = upstream; zone 2 = downstream) |
|---|---|
| K1; K1' | 1 |
| K2; K2' | 0.5 |

Parts K1 and K2 were investigated in the freshly prepared state.

Before investigation of the catalytic properties, parts K1' and K2' were thermally pretreated in a flow-through furnace for 48 hours in an atmosphere containing 10 vol. % oxygen and 10 vol. % steam in nitrogen at 650° C.

Experimental Investigations of Nitrogen Oxide Conversion

All the catalytically active components produced in comparative examples 1 and 2 and in example 1 were tested for nitrogen oxide conversion in a laboratory model gas installation. The following test conditions were used:

| Composition of the model gas | |
|---|---|
| NO [vol-ppm]: | 500 |
| NH$_3$ [vol-ppm]: | 450 |
| O$_2$ [vol. %]: | 5 |
| H$_2$O [vol. %] | 1.3 |
| HC (C$_1$) [vol-ppm] | 200 |
| CO [vol-ppm] | 200 |
| N$_2$: | Remainder |
| General test conditions | |
| Space velocity [h$^{-1}$]: | 30 000 |
| Temperature [° C.]: | 500; 450; 400; 350; 300; 250; 200; 175; 150 |
| Conditioning before the start of measurement: | Model gas atmosphere; 600° C.; a few minutes |

During measurement, the nitrogen oxide concentrations of the model exhaust gas after the catalyst were recorded with a suitable analytical system. From the known, metered nitrogen oxide contents, which were verified during conditioning at the start of the respective test run with a pre-catalyst exhaust gas analyzer, and the measured nitrogen oxide contents after the catalyst, the nitrogen oxide conversion over the catalyst for each temperature measuring point was calculated as follows:

$$U_{NO_x}[\%] = 1 - \frac{c_{outlet}(NO_x)}{c_{inlet}(NO_x)} \cdot 100$$

with $c_{inlet/outlet}(NO_x) = c_{in/out}(NO) + c_{in/out}(NO_2) + c_{in/out}(N_2O) \ldots$ The nitrogen oxide conversion values $U_{NOx}$ [%] obtained were plotted, to assess the SCR activity of the test materials, as a function of the temperature measured before the catalyst.

FIG. 2 shows the result for the components according to the prior art VK1 and VK2 in comparison with the component K1 according to the invention in the freshly prepared state. All these components have a ratio of the first, upstream catalyst zone to the second, downstream catalyst zone of 1.

The component VK2, made exclusively from zeolite-based SCR catalysts, which was prepared according to example 2 in WO 2008/006427, shows the poorest NO$_x$ conversion. Component K1 according to the invention shows roughly the same conversion behavior as VK1, but manages without toxicologically questionable vanadium compounds in the first SCR catalyst zone.

Figure 3:
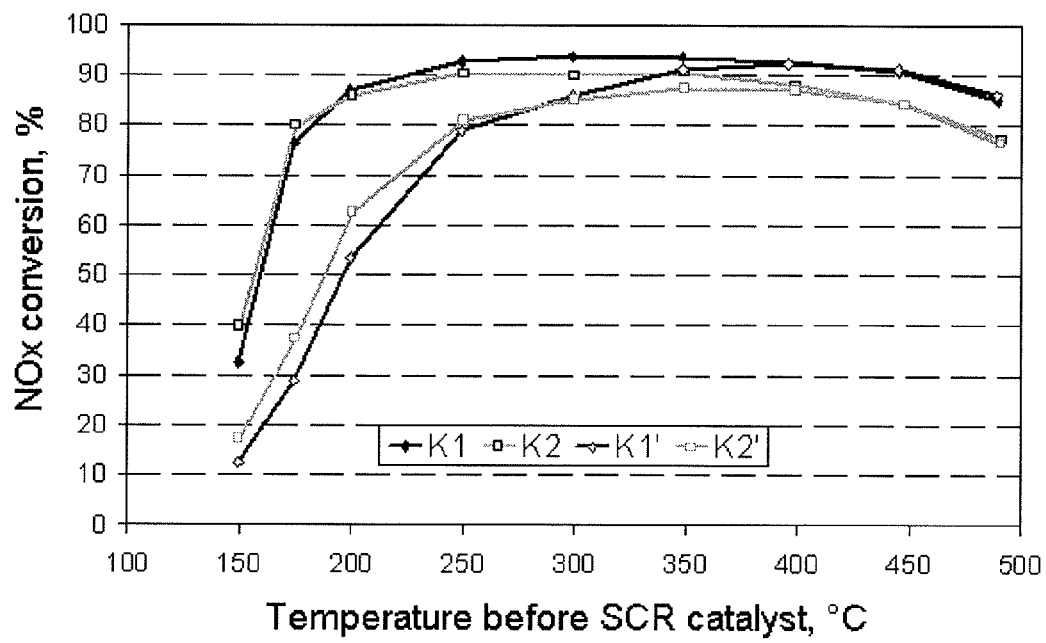

The influence of the length ratio of the catalyst zones on the NO$_x$ conversion behavior was investigated under the same test conditions, but in an HC- and CO-free model gas. FIG. 3 shows the result of the investigations for components according to the invention in the freshly prepared and in the thermally pretreated state. K1 (freshly prepared) and K1' (thermally pretreated) have a zone length ratio of 1. With K2 (fresh) or K2' (thermally pretreated), the zone with the second, downstream SCR catalyst is twice as long as the zone with the first, upstream SCR catalyst (ratio of the zones 0.5).

In the freshly prepared state, variation of the zone length in the low temperature range up to 250° C. has no significant influence on the conversion behavior. At higher temperatures the nitrogen oxide conversions on K2 (zone ratio 0.5) are somewhat lower and decrease slightly above 400° C. as a result of ammonia over-oxidation to N$_2$O in the zone containing Cu-zeolite arranged downstream.

In the thermally pretreated state, component K2' shows definite advantages in the low temperature range up to 300° C. Then the conditions are reversed.

The ideal dimensioning of the zone lengths relative to one another or of the volume ratio of the first and of the second SCR catalyst to one another thus depends decisively on the target application. For mainly lower-temperature applications (T<300° C.) a shift of the length ratio (volume ratio) in favor of the zone on the outlet side to values less than 1 is suitable. For high temperature applications the upstream SCR catalyst should be larger than the second SCR catalyst arranged downstream.

Experimental Investigations of the HC Oxidation Behavior of the Second SCR Catalyst Arranged Downstream The HC oxidation behavior of the second, downstream SCR catalyst was not investigated on a zoned component, but on an individual catalyst VK3. For production of VK3, a copper-exchanged β-zeolite compound containing 5 wt. % Cu relative to the total weight of the exchanged zeolite compound was applied as a coating in a conventional dipping process on an inert ceramic honeycomb. The honeycomb had a volume of 0.04 l, a length of 76.2 mm and a cell count of 62 cells per cm$^2$. The wall thickness of the cells was 0.17 mm.

Figure 4:
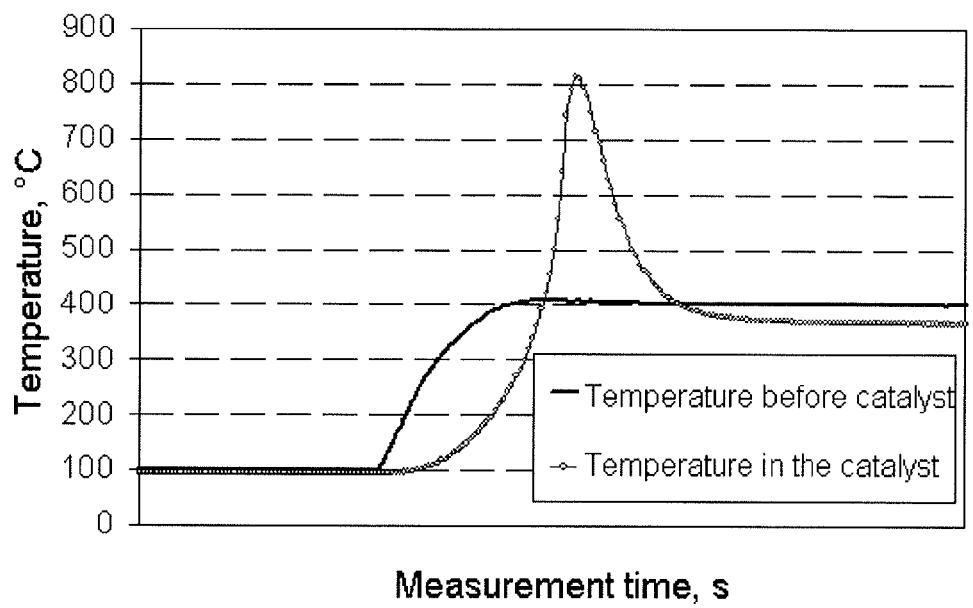
Figure 5:
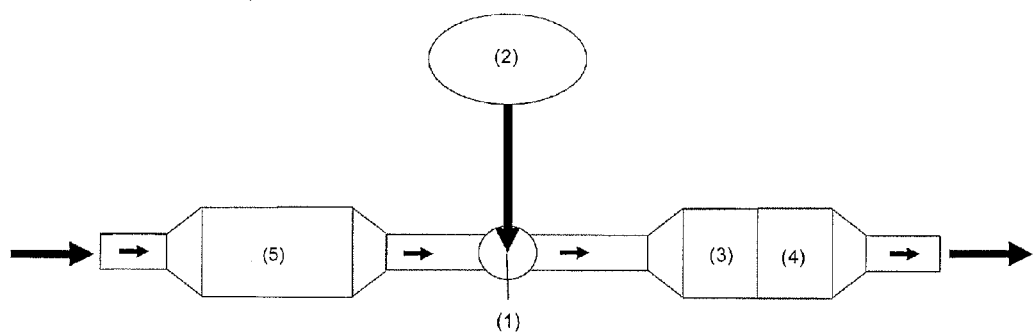

So as to be able to assess the effects of incomplete HC oxidation in the first SCR catalyst and the consequences of burnoff of hydrocarbons stored in the zeolites on the second catalyst, the exotherm resulting from such burnoff was investigated. For this, VK3 was first deliberately "loaded" with hydrocarbon in an HC-containing exhaust gas at 100° C. The hydrocarbons of the exhaust gas were stored in the zeolite structure. Then preconditioning of the HC-loaded catalyst VK3 was carried out in a model gas atmosphere containing 10 vol. % O$_2$, 10 vol. % CO$_2$ and 5 vol. % H$_2$O in nitrogen at 100° C. for 10 minutes and the temperature was increased from 100° C. to 400° C. FIG. 4 shows the temperature variation before and after VK3. It can be seen from the temperature variation in the catalyst that the HC-burnoff is ignited at a temperature of approx. 260° C. before the catalyst. The resultant exotherm leads to a temperature rise in the catalyst of more than 800° C. This temperature loading typically results in damage of the zeolite framework structure, so that as a result of such HC-burnoff on the downstream SCR catalyst, pronounced impairment of its SCR activity is to be expected.

This means that the long-term stability of an exhaust gas purification system of two SCR catalysts in HC-containing exhaust gas also depends decisively on how well hydrocarbons from the exhaust gas can be converted over the first, upstream SCR catalyst. The upstream SCR catalyst, which is preferred in the system according to the invention, has good HC oxidation activity, comparable to a vanadium-containing SCR catalyst, but without containing toxicologically questionable compounds. We believe that accordingly the system according to the invention, in addition to greatly improved "kick-off" behavior relative to the wholly zeolitic systems according to the prior art, also has improved long-term stability in the SCR reaction.

The invention claimed is:

1. A method of treatment of diesel engine exhaust gases in an exhaust system containing nitrogen oxides and hydrocarbons comprising:
   (a) addition of ammonia or of a compound decomposable to ammonia from a source that does not form part of the exhaust system into the exhaust gas stream containing nitrogen oxides and hydrocarbons;
   (b) passing the exhaust gas stream containing nitrogen oxides, hydrocarbons and ammonia or a compound decomposable to ammonia over a first, upstream SCR catalyst, which catalyzes the comproportionation of nitrogen oxides with ammonia in a temperature range between 300° C. and 500° C., while at least partially oxidizing the hydrocarbons contained in the exhaust gas; and
   (c) passing the exhaust gas resulting from (b) over a second, downstream SCR catalyst, which catalyzes the comproportionation of nitrogen oxides with ammonia in a temperature range between 150° C. and 400° C. and at the same time stores excess ammonia.

2. The method as claimed in claim 1, wherein
the exhaust gas stream containing nitrogen oxides and hydrocarbons is led, before the addition of ammonia or of a compound decomposable to ammonia in (a), over an oxidation catalyst that oxidizes at least a portion of the NO contained in the nitrogen oxides to $NO_2$.

3. The method as claimed in claim 2, wherein
the $NO_2/NO_x$ ratio in the exhaust gas is altered so that the exhaust gas stream, before being led over the first, upstream SCR catalyst in (b), has an $NO_2/NO_x$ ratio from 0.3 to 0.7.

4. The method as claimed in claim 1, wherein
the amount of ammonia or of a compound decomposable to ammonia to be added to the exhaust gas stream in (a) is selected so that the exhaust gas stream, before being led over the first, upstream SCR catalyst in (b), has an $NH_3/NO_x$ ratio from 0.8 to 1.2.

5. The method as claimed in claim 4, wherein
the exhaust gas stream, after being passed through the second, downstream SCR catalyst in (c), is led over an oxidation catalyst, which selectively catalyzes the oxidation of ammonia to nitrogen.

6. The method as claimed in claim 5, wherein
the oxidation catalyst is arranged on a soot particle-filtering support.

7. The method as claimed in claim 1, wherein
the first, upstream SCR catalyst, which the exhaust gas stream is passed over in (b), does not contain zeolite compounds.

8. The method as claimed in claim 7, wherein
the first, upstream SCR catalyst, which the exhaust gas stream is passed over in (b), contains neither vanadium compounds nor zeolite compounds.

9. The method as claimed in claim 1, wherein
the first, upstream SCR catalyst, which the exhaust gas stream is passed over in (b), contains tungsten oxide $WO_3$ and a homogeneous cerium-zirconium mixed oxide $(Ce,Zr)O_2$.

10. An exhaust gas purification system for lowering the content of nitrogen oxides in the lean exhaust gas of an internal combustion engine containing, in combination and in this order:
    (1) a feeding device that feeds ammonia or a compound decomposable to ammonia into the exhaust gas stream containing nitrogen oxides from a source that does not form part of the exhaust system;
    (2) a first, upstream SCR catalyst, which catalyzes the comproportionation of nitrogen oxides with ammonia in a temperature range between 300° C. and 500° C. and contains neither vanadium compounds nor zeolite compounds; and
    (3) a second, downstream and vanadium-free SCR catalyst, which catalyzes the comproportionation of nitrogen oxides with ammonia in a temperature range between 150° C. and 400° C. and contains a copper- (Cu-)exchanged zeolite compound.

11. The exhaust gas purification system as claimed in claim 10, wherein
each of the two SCR catalysts is in form of a coating on an inert support.

12. The exhaust gas purification system as claimed in claim 10, wherein
the first and the second SCR catalyst are arranged as coatings on the same support.

13. The exhaust gas purification system as claimed in claim 12, wherein
the first, upstream SCR catalyst is in the form of a coating zone arranged on the inlet side on the support and the second, downstream SCR catalyst forms the coating zone on the outlet side on the support.

14. The exhaust gas purification system as claimed in claim 13, wherein
the ratio of the lengths of coating zone arranged on the inlet side to coating zone on the outlet side is between 0.1 and 3.

15. The exhaust gas purification system as claimed in claim 10, wherein
the first SCR catalyst contains tungsten oxide $WO_3$ and a homogeneous cerium-zirconium mixed oxide $(Ce,Zr)O_2$.

16. The exhaust gas purification system as claimed in claim 15, wherein
the content of tungsten oxide $WO_3$ in the first SCR catalyst is between 5 and 25 wt. %, relative to the total amount of the first SCR catalyst without consideration of the mass of the inert support.

17. The exhaust gas purification system as claimed in claim 15, wherein
the content of homogeneous cerium-zirconium mixed oxide $(Ce,Zr)O_2$ in the first SCR catalyst is between 50 and 95 wt. %, relative to the total amount of the first SCR catalyst without consideration of the mass of the inert support.

18. The exhaust gas purification system as claimed in claim 17, wherein
the weight ratio of cerium oxide $CeO_2$ and zirconium oxide $ZrO_2$ in the homogeneous cerium-zirconium mixed oxide $(Ce,Zr)O_2$ is between 0.43 and 2.33.

19. The exhaust gas purification system as claimed in claim 10, wherein the second SCR catalyst contains a copper- (Cu-)exchanged zeolite compound with a content of 2 to 10 wt. % Cu relative to the total weight of the zeolite compound.

20. The exhaust gas purification system as claimed in claim 18, wherein
the zeolite compound is selected from the group consisting of beta-(β-)zeolite, Y-zeolite, ZSM-5, ZSM-20, ferrierite and mordenite.

* * * * *